Aug. 22, 1950         A. L. WILBER         2,519,526
PORTABLE POWER-DRIVEN SAW
Filed July 29, 1946
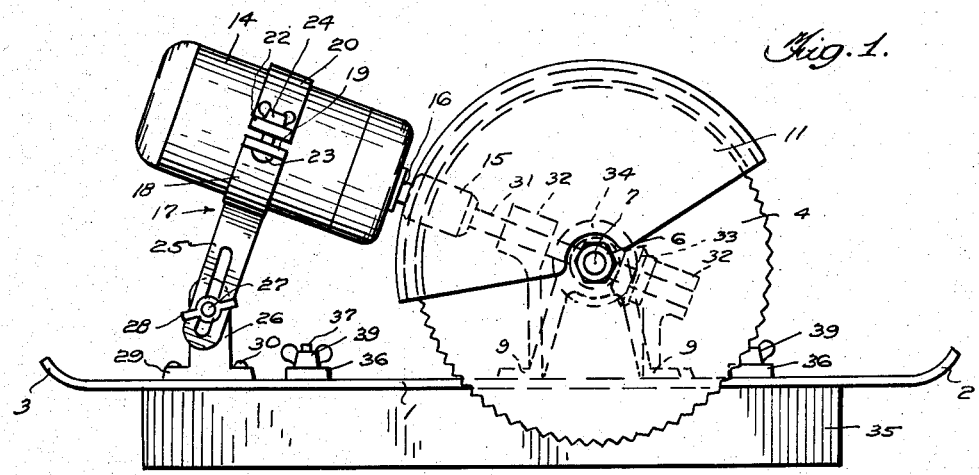
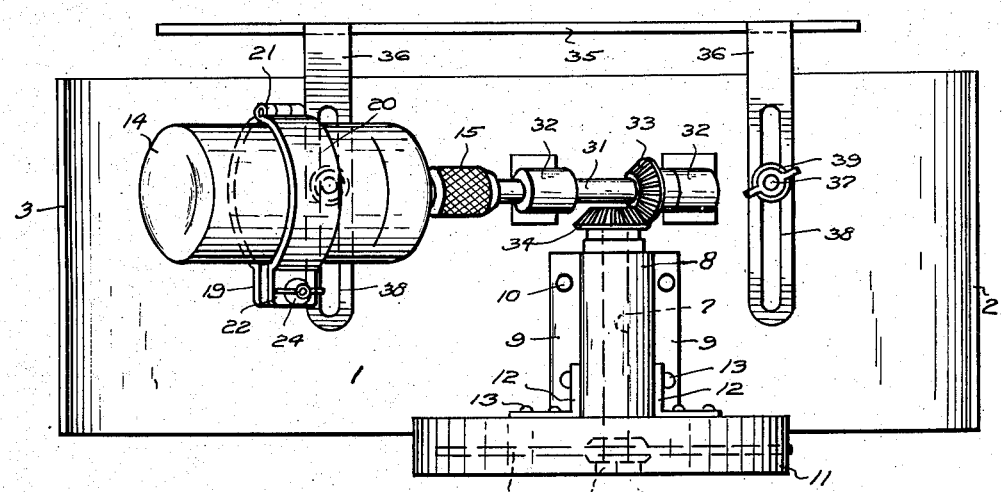
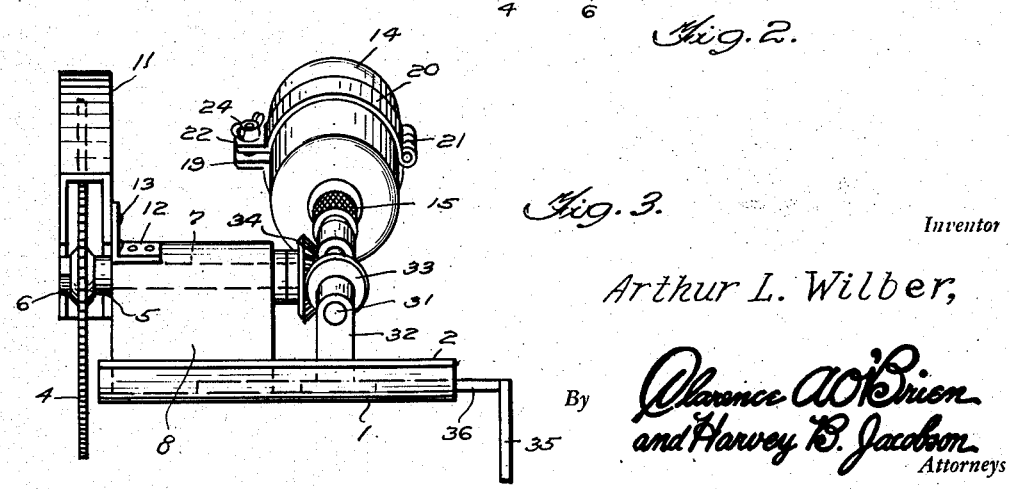
Inventor
Arthur L. Wilber,
By Clarence A. O'Brien
and Harvey B. Jacobson
Attorneys Patented Aug. 22, 1950

2,519,526

UNITED STATES PATENT OFFICE 2,519,526

PORTABLE POWER-DRIVEN SAW

Arthur L. Wilber, Cleveland, Ohio

Application July 29, 1946, Serial No. 686,943

1 Claim. (Cl. 143—43)

My invention relates to improvements in portable power driven saws of the type designed to be pushed over the work.

The invention is designed with the objects in view of providing a motor driven circular saw of few parts and inexpensive construction adapted for either rip or cross-cut sawing and which is especially constructed to be easily pushed along the work and will not readily get out of order from wear or prolonged use.

To the accomplishment of the above, and subordinate objects presently appearing, a preferred embodiment of my invention has been illustrated in the accompanying drawings, set forth in detail in the succeeding description, and defined in the claim attached hereto.

In said drawings:

Figure 1 is a view in side elevation of my improved portable power driven saw in a preferred embodiment thereof.

Figure 2 is a view in plan, and

Figure 3 is a view in front end elevation.

Reference being had to the drawing by numerals, according to my invention, as shown, a portable power driven saw is provided comprising a base skid plate 1 of elongated rectangular form and any suitable light strong metal, and which is formed with upwardly curved front and rear ends 2, 3 adapting the same to be easily shoved endwise over a piece or work, not shown.

At one side of the base skid plate, constituting the outboard side, is a disc saw 4, of any suitable type, depending for a suitable distance below said plate and having a hub 5 suitably fixed, as by a nut 6 on the outer end of a driven shaft 7 extending part way across the base skid plate 1 and journalled in a bearing block 8 with side base flanges 9 bolted, as at 10, to said plate.

A segmental guard 11 covers the upper portion of the disc saw 4 and is secured to the bearing block 8 by angle brackets 12 and bolts 13.

A motor 14 surmounts the base skid plate 1, adjacent the rear end 3 thereof, and which, preferably, is of the type forming part of the usual hand drill of commerce and driving a chuck 15 on the armature shaft 16 thereof.

A clamp 17 supports the motor 14 in a downwardly and forwardly inclined position, relative to the base skid plate 1, with the chuck 15 facing toward the front end 2 of said skid plate 1 and the axis of the motor intersecting the axis of the driven shaft 16. The clamp 17 comprises an arcuate yoke 18 supporting the motor 14 with an angular ear 19 on one end thereof, an arcuate clamping band 20 hinged at one end thereof to the other end of the yoke 18, as at 21, and provided with an angular ear 22 detachably secured to the ear 19 by a bolt 23 and wing nut 24, and a longitudinally slotted stem 25 depending from the yoke 18. The stem 25 is secured to a post 26 by means of a bolt 27 and a wing nut 28 providing for vertical adjustment of the clamp 17 as well as swinging adjustment of said clamp. The post 26 is secured to the base skid plate 1 by flanges 29 on the post and bolts 30 extending through said flanges into said plate.

A motion transmitting shaft 31 is detachably secured at one end in the chuck 15 and journalled in laterally spaced bearings 32 arising from the base skid plate 1 and suitably secured to said plate, in a manner not shown. One of the bearings 32 functions as an end thrust bearing for a bevel gear 33 fastened on the motion transmitting shaft 31 intermediate the bearings 32 and meshing with a bevel gear 34 fastened on the inner end of the driven shaft 7.

A guide bar 35 is provided to extend along the inboard edge of the base skid plate 1, longitudinally, and depend below said plate a distance suitable for a purpose presently seen. A pair of bar supporting arms 36 extend laterally from said guide bar 35, adjacent to opposite ends thereof, and over the base skid plate 1 to which the same are adjustably secured by means of bolts 37 arising from said plate 1 and extending through longitudinal slots 38 in said arms with wing nuts 39 thereon for clamping the said arms to said plate 1.

The motor 14 may be connected, by any suitable means, not shown, to a source of electrical energy.

The manner in which the described invention is used and operated will be readily understood. Suffice it to explain that the base skid plate 1 is shoved along, or over, the work, not shown, to feed the disc saw 4 forwardly and said plate and saw are guided in a straight course by sliding of the guide bar 35 along one edge of the work. By adjusting the guide bar 35 toward or from the adjacent edge side of said plate 1, through the medium of the wing nuts 39, slots 38 and bolts 37, the distance at which the disc saw 4 will cut from one edge of the work may be predetermined. By detaching the chuck 15 from the motion transmitting shaft 31 and opening up the clamp 17, in a manner which will be clear, the motor 14 may be removed for servicing or replacement easily and quickly. By adjusting the stem 25 on the post 26, through the medium of the wing nut 28, bolt 27 and the slot 25 in said stem, the motor 14 may be accurately aligned with the motion transmitting shaft 31 in assembling the parts of the saw.

The foregoing, will, it is believed, suffice to impart a clear understanding of my invention, without further explanation.

Manifestly, the invention, as described, is susceptible of modification without departing from the inventive concept, and right is herein reserved to such modifications as fall within the scope of the appended claim.

I claim as my invention:

In a portable saw, a base skid plate, a transverse driven shaft mounted on said plate and having a disc saw fastened on one end thereof, a motion transmitting shaft mounted on said plate at a right angle to said driven shaft, operating connections between said motion transmitting shaft and said driven shaft connecting said shafts in right angular relation, a motor with the armature shaft thereof provided with a chuck detachably attached to one end of the motion transmitting shaft, and a clamping yoke gripping and supporting said motor and pivotally and slidably mounted on said plate in upstanding position for vertical swinging and adjustment laterally of the motion transmitting shaft to align the chuck with said end of the motion transmitting shaft in attaching said chuck.

ARTHUR L. WILBER.

REFERENCES CITED

The following references are of record in the file of this patent:

UNITED STATES PATENTS

| Number | Name | Date |
| --- | --- | --- |
| Re. 17,087 | Billingsley | Sept. 25, 1928 |
| 1,530,886 | Gora | Mar. 24, 1925 |
| 1,779,031 | Casey | Oct. 21, 1930 |
| 1,785,065 | Aborn | Dec. 16, 1930 |
| 1,932,511 | Clarke | Oct. 31, 1933 |
| 2,319,973 | Broderhausen | May 25, 1943 |